United States Patent [19]

Sydansk

[11] Patent Number: 5,462,390
[45] Date of Patent: Oct. 31, 1995

[54] FOAMED GEL FOR BLOCKING FLUID FLOW IN SOIL

[75] Inventor: Robert D. Sydansk, Littleton, Colo.

[73] Assignee: Marathon Oil Company, Findlay, Ohio

[21] Appl. No.: 368,522

[22] Filed: Jan. 4, 1995

Related U.S. Application Data

[63] Continuation-in-part of Ser. No. 336,150, Nov. 8, 1994.
[51] Int. Cl.$^6$ ..................................................... E02D 3/12
[52] U.S. Cl. ........................... 405/264; 405/270; 523/132
[58] Field of Search ........................ 166/295; 523/130, 523/132; 405/264, 270, 128

[56] References Cited

U.S. PATENT DOCUMENTS

| | | | |
|---|---|---|---|
| 3,393,738 | 7/1968 | Bernard et al. | |
| 4,291,069 | 9/1981 | Pilny | 405/264 X |
| 4,300,634 | 11/1981 | Clamplitt | 166/272 |
| 4,300,861 | 11/1981 | Vartiak | 405/264 |
| 4,521,452 | 6/1985 | Highsmith | 427/136 |
| 4,582,452 | 4/1986 | Sabi et al. | 405/264 |
| 4,694,906 | 9/1987 | Hutchins et al. | 166/294 |
| 4,844,163 | 7/1989 | Hazlett et al. | 166/270 |
| 5,002,431 | 3/1991 | Heymans et al. | 405/128 |
| 5,103,910 | 4/1992 | Chan | 405/264 X |
| 5,322,125 | 12/1994 | Sydansk | 166/295 |
| 5,372,462 | 12/1994 | Sydansk | 405/264 |

*Primary Examiner*—George A. Suchfield
*Attorney, Agent, or Firm*—Jack L. Hummel; Jack E. Ebel

[57] ABSTRACT

A soil treatment process is provided utilizing a foamed gel to block the flow of a migratory fluid in a soil. Placement of the foamed gel in a desired treatment region of the soil produces a seal that substantially eliminates the permeability of the treatment region to the migratory fluid and prevents migration of fluid across the region. In each of its numerous embodiments, the process can be employed as either a remedial or a preventative treatment.

17 Claims, No Drawings

FOAMED GEL FOR BLOCKING FLUID FLOW IN SOIL

The present patent application is a CIP of U.S. Ser. No. 08/336,150, filed Nov. 8, 1994.

BACKGROUND OF THE INVENTION

Technical Field

The present invention relates to a process for blocking fluid flow in a soil, and more particularly to a process for placing a foamed gel in a soil to reduce the flow capacity of a soil to a migratory fluid.

Description of Related Art

A number of gels are known in the art capable of blocking the flow of water through geological material. U.S. Pat. No. 4,521,452 teaches rigid gels positionable in near-surface soils that function as grout, thereby reducing the infiltration of water into man-made structures adjacent to the soils, such as tunnels or sewer lines. U.S. Pat. No. 4,582,452 teaches an aqueous gel positionable in relatively deep subterranean geological formations, such as consolidated geological matrix, to prevent the flow of underground water therethrough. Such gels have particular utility in oil production or subterranean construction applications.

In certain specific subterranean permeability-reduction applications, foamed gels have been successfully substituted for conventional unfoamed gels, thereby substantially reducing the chemical cost of the treatment without substantially diminishing the effectiveness of the treatment. For example, U.S. Pat. No. 5,322,125 employs a foamed gel to mitigate the inhibiting effect on oil production of gas coning in a formation having a gas cap overlying the oil production zone. The foamed gel is placed in the gas permeable matrix between the gas cap and production wellbore to reduce the flow of gas from the gas cap into the wellbore. Although such foamed gels effectively reduce the permeability of relatively deep formation matrices to migratory gases, foamed gels heretofore have not been considered applicable to near-surface soil sealing applications. Soils are generally less consolidated and more porous than matrix materials found in deeper formations. It is conventionally believed that foamed gels lack sufficient structure, strength and stability to perform effectively as soil sealants due to the relatively exposed and unconsolidated nature of soils. In particular, it is widely believed that foamed gels are more susceptible to degradation than conventional gels when exposed to the near-surface environment and further that foamed gels are more susceptible to mobilization than conventional gels when subjected to migratory liquids in unconsolidated soils. Thus, foamed gels have heretofore been deemed ineffective for soil sealing applications.

The present invention, nevertheless, recognizes a need for alternate materials as substitutes for conventional gels to effectively block the flow of migratory fluids through soils in a wide range of near-surface applications. In particular, the present invention recognizes a need for alternate soil sealing compositions that have sufficient structure, strength and stability to be relatively immobile in soil when subjected to the natural drift pressure of migratory liquids flowing therethrough, yet have a relatively low chemical cost as compared to conventional gels.

Accordingly, it is an object of the present invention to provide a soil treatment process for blocking the flow of migratory fluids in soil. It is another object of the present invention to provide such a soil treatment process that is operationally facile and economical. It is also an object of the present invention to provide such a soil treatment process that utilizes an effective fluid blocking composition. It is further an object of the present invention to provide such a soil treatment process that utilizes a relatively low cost and environmentally compatible fluid blocking composition.

SUMMARY OF THE INVENTION

The present invention is a near-surface soil treatment process utilizing a specific composition to block the flow of a migratory fluid through a soil. The specific composition is a foamed gel, heretofore believed ineffective for near-surface soil treatments, but determined in the context of the present invention to have substantial utility in such soil treatments. Placement of the foamed gel in a desired volume of soil constituting the treatment region produces a seal that substantially eliminates the permeability of the treatment region at normal fluid drift pressures and prevents the migration of the fluid across the treatment region. In each of its numerous embodiments set forth hereafter, the process can be employed as either a remedial or a preventative treatment.

In accordance with one embodiment, the process mitigates the effect of surface or subsurface leaks or spills of toxic, hazardous or otherwise undesirable fluids into soil, preventing the migration of such fluids through the soil into drinking water supplies or other water sources. In accordance with another embodiment, the process seals soil surrounding building structures, preventing the invasion of rainwater or groundwater into the structures. In accordance with yet another embodiment, the process provides linings under surface liquid containments preventing leakage of liquids from the containment into surrounding soil or underlying strata. In accordance with still another embodiment, the process provides a fluid impermeable barrier between topsoil and underlying subterranean strata. The barrier prevents the downward percolation of contaminated surface water or leachate into the underlying strata, prevents the upward migration of underlying alkaline aquifer water into the arable topsoil, or prevents the loss of rainwater or irrigation water from the arable topsoil to underlying strata.

The process, in each of its embodiments, comprises generation of the foamed gel and placement of the foamed gel in the soil of the desired treatment region. The foamed gel comprises a crosslinkable polymer, a crosslinking agent, an aqueous solvent, a surfactant, and an added gas. The crosslinkable polymer is a carboxylate-containing polymer having one or more carboxylate crosslinking sites. The crosslinking agent includes a reactive transition metal cation in the presence of one or more organic and/or inorganic anions. The cation is maintained either in the form of a salt solution including the one or more organic and/or inorganic anions, or in the form of a chemical complex, associated with one or more organic and/or inorganic ligands.

Regardless of the form of the crosslinking agent, it functionally serves to crosslink the carboxylate-containing polymer, thereby imparting a high degree of structure and strength to the resulting crosslinked polymer network. At the same time, the surfactant uniformly disperses the added gas throughout the crosslinked polymer network to form the foamed gel without unduly diminishing the structure and strength of the crosslinked polymer network. Consequently, the foamed gel displays soil sealing characteristics approaching those of corresponding conventional unfoamed gels at a substantially reduced chemical cost.

In accordance with one embodiment of the present invention, a foamed gel having the above-described composition is prepared by premixing a gelation solution at the surface containing the foamed get components exclusive of the added gas. The added gas is then dispersed within the gelation solution under foaming conditions, either before, after, or during injection of the gelation solution into the soil. The resulting foamed gel, which is characterized as either an immature or a mature foamed gel, is displaced into the soil of the desired treatment region. If the foamed gel is immature upon displacement into the desired treatment region, it is aged to maturity therein. If the foamed gel is mature upon displacement into the desired treatment region, no further aging of the foamed gel is required.

Addition of the gas to the gelation solution before injection of the gelation solution into the soil generates a preformed foamed gel at the surface before the foamed gel enters the soil. Placement of the preformed foamed gel in the soil is subsequently effectuated by injecting the preformed foamed gel into the soil via injection means and displacing the foamed gel into the desired treatment region of the soil. If the foamed gel is immature upon displacement into the desired treatment region, it is aged to maturity therein. If the foamed gel is mature upon displacement into the desired treatment region, no further aging of the foamed gel is required.

Addition of the gas to the gelation solution in situ after injection of the gelation solution into the soil generates the foamed gel in situ. rendering placement of the foamed get substantially simultaneous with generation thereof. Placement of the foamed gel is effectuated by sequentially injecting the foamed gel components into the soil via injection means, generating the foamed gel from the foamed gel components in situ, and displacing the resulting foamed gel into the desired treatment region of the soil. If the foamed gel is immature upon displacement into the desired treatment region, it is aged to maturity therein. If the foamed gel is mature upon displacement into the desired treatment region, no further aging of the foamed gel is required.

Addition of the gas to the gelation solution during injection of the gelation solution into the soil is achieved by coinjection of the gas and gelation solution into the soil. The foamed gel is either generated in the injection means before the foamed gel enters the soil or, alternatively, in situ after the foamed gel components enter the soil. In either case, placement of the resulting foamed gel is effectuated by displacement into the desired treatment region.

In accordance with an alternate embodiment of the process of the present invention, a foamed gel having the above-described composition is prepared by premixing a polymer-enhanced foam at the surface containing the foamed gel components exclusive of the crosslinking agent. The crosslinking agent is then metered into the polymer-enhanced foam during injection of the foam into the soil. The resulting immature foamed gel is displaced into the desired treatment region and aged to maturity therein.

Regardless of the particular sequence in which the foamed gel is formulated, the mature foamed gel resulting therefrom is employed in the near-surface treatment region in the conventional manner of a soil sealant. In accordance with such teaching, the foamed gel can be placed in the treatment region prior to the occurrence of fluid migration therethrough as a preventative treatment or, alternatively, the foamed gel can be placed in the treatment region after the occurrence or detection of fluid migration therethrough as a remedial treatment.

DESCRIPTION OF PREFERRED EMBODIMENTS

A number of specific terms are used throughout the specification to describe the process of the present invention and are defined as follows. "Fluid flow capacity" is proportional to permeability and is defined as the degree to which porous media facilitates or, conversely, resists fluid flow. "Soil" is near-surface earthen geological material that is usually unconsolidated and weathered. "Soil", as used herein, can also be material contained in man-made earthen formations, such as dams, dikes, levees, and the like. "Strata" are any substantially horizontally disposed geological structures beneath the earthen surface. A "gel" or "gel medium" is a continuous three-dimensional chemically crosslinked polymeric network integrating a liquid into the interstices of the network. A "foamed gel" is a composition having a stabilized gas dispersion within a gel medium. The foamed gel structure is made up of gas bubbles separated from one another by the gel medium, usually in the form of lamellae of interfacially stabilized films. A "polymer enhanced foam" is a stabilized dispersion of a gas phase maintained within a liquid phase, wherein the liquid phase is an aqueous solution having a surfactant and an uncrosslinked polymer dissolved therein. Other terms used herein have definitions in accordance with the conventional usage of a skilled artisan, unless otherwise defined hereafter.

The foamed gel utilized in the present invention comprises a crosslinkable polymer, a crosslinking agent, a liquid solvent, a surfactant, and an added gas. Although many crosslinkable polymers are known in the art, the crosslinkable polymers specifically applicable to the present invention are carboxylate-containing polymers. Preferred among the carboxylate-containing polymers are acrylamide-containing polymers. Of the acrylamide-containing polymers, the more preferred are polyacrylamide (PA), partially hydrolyzed polyacrylamide (PHPA), as well as copolymers, terpolymers and tetrapolymers of acrylamide. PA, as defined herein, has from 0 mole % to less than about 0.1 mole % of its amide groups hydrolyzed. Although 0 mole % hydrolyzed PA initially lacks any carboxylate groups, it can undergo autohydrolysis under the conditions of the present process to generate carboxylate groups, thereby satisfying the definition of a carboxylate-containing polymer having utility within the scope of the present invention. PHPA, as defined herein, has at least about 0.1 mole %, but not 100 mole %, of its amide groups hydrolyzed to carboxylate groups. It is noted that copolymers of acrylamide and acrylate are within the definition of PHPA as used herein. Other exemplary acrylamide polymers having utility herein are copolymers, terpolymers or tetrapolymers containing AMPS or vinylpyrrolidone. The average molecular weight of an acrylamide polymer having utility herein is generally in a range between about 100,000 and about 30,000,000, and preferably between about 200,000 and about 25,000,000.

The crosslinking agent of the present invention effectuates chemical crosslinking between appropriate sites of the same or other polymer molecules, thereby creating the polymer network structure of the gel medium. Crosslinking agents having utility herein are compositions containing a reactive transition metal cation. Such compositions include organic or inorganic salts of the reactive transition metal cation. Preferred salts are inorganic salts of a trivalent chromium cation such as chromic trichloride. Other such compositions having utility herein as crosslinking agents include water-soluble complexes containing the reactive transition metal cation associated with one or more organic carboxylate anions and/or inorganic anions.

The term "organic carboxylate anion" as used herein encompasses carboxylate anionic species including monocarboxylate anions, such as acetate, poly-carboxylate anions, such as malonate, and substituted derivatives of carboxylate anions, such as glycolate, lactate and citrate. The carboxylate anions are generally obtained from the corresponding acids or salts thereof. Preferred among such complexes are those including a trivalent chromium cation complexed with the carboxylate anion. An example of such a preferred complex is the trivalent chromium cation complexed with the acetate anion to form chromium triacetate as taught in U.S. Pat. No. 4,683,949 incorporated herein by reference. The chromium triacetate complex can be in the form of, or derived from, solid $CrAc_3$, solid $CrAc_3.H_2O$, solid $Cr_3Ac_7(OH)_2$ or a solution labeled "Chromic Acetate 50% Solution" that is commercially available, for example, from McGean-Rohco, Inc., 50 Public Square, Suite 1250, Cleveland, Ohio 44113, U.S.A.

The aqueous solvent of the gelation solution is substantially any aqueous liquid capable of forming a gelation solution from the solvent, crosslinkable polymer, crosslinking agent and surfactant. The term "solution" as used herein, in addition to true solutions, is intended to broadly encompass dispersions, emulsions, or any other homogeneous mixture of the gelation solution components in the aqueous solvent. The solvent is preferably a fresh water, although a brine, such as sea water or aquifer water from a subterranean formation can also have utility herein.

The surfactant may be substantially any conventional anionic, cationic or nonionic surfactant which is distributed throughout the gel medium to stabilize the interfaces between the solvent and gas. Anionic, cationic and nonionic surfactants are well known in general and are commercially available. Unlike conventional foams, the present foamed gel has been found to be relatively insensitive to the chemistry of the employed surfactants. Specific surfactants having utility in the present invention include ethoxylated sulfates, ethoxylated alcohols, petroleum sulfonates, and alpha olefin sulfonates.

The added gas may be substantially any gas that is substantially unreactive with the above-recited polymer, crosslinking agent, solvent and surfactant components and that is capable of being dispersed throughout the liquid medium. Examples of added gasses having utility herein are air, nitrogen, carbon dioxide, nitrous oxide, natural gas, or flue gas. Nitrogen or air are preferably used in the production of the present foamed gels.

The foamed gel is prepared in accordance with a first embodiment by initially formulating a gelation solution at the surface that is a homogeneous fluid admixture of the solvent, polymer, crosslinking agent and surfactant. Surface admixing broadly encompasses batch mixing the components in bulk prior to placement in the treatment region or dynamically mixing the components in-line on the fly during placement in the treatment region.

The pH of the gelation solution is generally within a range of about 2 to about 10, preferably within a range of about 3 to about 9, and more preferably within a nearly neutral range of about 5 to about 8. In most cases, the pH of the gelation solution inherently falls within the above-recited range without any pH adjustment thereof. However, should the pH of the gelation solution be outside the desired range, the pH can be adjusted prior to or during generation of the foamed gel to achieve a desired pH range. The pH adjustment can be made in any manner known to the skilled artisan. Nevertheless, it has been found that the present process is relatively insensitive to the pH of the gelation solution.

The polymer concentration of the gelation solution is generally at least about 500 ppm, preferably at least about 2,000 ppm, and most preferably within a range between about 3,000 ppm and about 100,000 ppm. The trivalent chromium cation concentration of the gelation solution is generally between about 10 ppm and about 20,000 ppm, and preferably between about 20 ppm and about 4,000 ppm. The crosslinking agent is present in amounts such that the mole ratio of the carboxylate anions of the crosslinking agent to the trivalent chromium cations of the gelation solution is between about 0.5:1 and 100:1 and preferably between about 3:1 and 25:1. The surfactant concentration in the gelation solution is about 10 ppm to about 50,000 ppm, preferably about 100 ppm to about 10,000 ppm, and most preferably about 200 ppm to about 8,000 ppm. Typically, the gelation solution is prepared by mixing discrete aqueous solutions of the polymer, crosslinking agent, and surfactant.

For acrylamide-containing polymers having carboxylate groups, crosslinking, or gelation as it is alternatively termed, is normally initiated as soon as the polymer and crosslinking agent contact unless an optional delaying agent is included in the gelation solution. If a delaying agent is present, crosslinking is not initiated until after activation of the crosslinking agent. Delaying agents that may have utility in the gelation solution of the present invention are water-soluble acids and salts of carboxylate anions. The carboxylate anion of the acid or salt delaying agent can be the same species as the carboxylate anion of the crosslinking agent or can be a different species.

Preferred delaying agents in the practice of the present invention are salts or acids of acetate, lactate, malonate, citrate, and glycolate. Among the preferred delaying agents are lactate and acetate salts, such as ammonium lactate, potassium lactate, sodium lactate, ammonium acetate, potassium acetate, and sodium acetate. Of the preferred delaying agents, malonate and citrate have the highest degree of ligand strength and acetate the lowest with glycolate and lactate being of intermediate strength. The delay time for the polymer crosslinking reaction in the presence of such delaying agents is normally a direct function of the ligand strength of the delaying agent and the concentration of the delaying agent relative to the concentration of the crosslinking agent. In particular, for a given delaying agent, the delay time is a function of the mole ratio of the carboxylate anion of the delaying agent to the transition metal cation of the crosslinking agent. Thus, the length of the delay time for the polymer crosslinking reaction increases as the mole ratio of carboxylate to metal ions increases. The delay time for the crosslinking reaction of an acrylamide polymer is also a function of the initial degree of polymer hydrolysis and the rate of the polymer hydrolisys reaction. In some cases, substantial gelation of the acrylamide polymer may not occur before the hydrolysis reaction proceeds. For example, crosslinking of PA does not normally occur until the PA has undergone a significant degree of hydrolysis. Thus, the gelation delay time decreases as the degree of initial polymer hydrolysis and the rate of the hydrolysis reaction is increased.

Preparation of the foamed gel proceeds by combining the added gas with the aqueous gelation solution to form a mature or immature foamed gel. The foamed gel is characterized as being immature before crosslinking is completed, but once crosslinking has gone to completion, i.e., when either substantially all of the crosslinking agent or substantially all of the carboxylate crosslinking sites is consumed, the foamed gel is characterized as being mature. The integral components of the foamed gel are the gel medium and the added gas dispersed therein. The crosslinked polymer makes up the structural network of the gel medium and the liquid solvent makes up the interstitial liquid of the medium.

The added gas is combined with the gelation solution by conventional means such as sparging, high speed mixing, or simultaneously flowing the gas and gel composition through one or more orifices, such as a screen or a plate with one or more orifices, or through a solid packing, such as a sandpack or a gravel pack. The location and timing of the gas addition step can be any one of several alternatives. In one alternative, the added gas is combined with the liquid gelation solution at the surface before injection into the soil by passing the liquid phase and gas through a surface foam generator. The resulting foamed gel is then delivered to an injection means. Alternatively, the added gas and liquid gelation solution are combined by coinjecting the gas and liquid phase into the soil across a surface injection tee acting as a foam generator, or by coinjecting the gas and liquid phases via separate or common injectors into the soil and passing them through a common subsurface foam generator before entering the soil.

In accordance with an alternate embodiment of preparing the foamed gel, a polymer-enhanced foam is premixed at the surface containing the foamed gel components exclusive of the crosslinking agent. The crosslinking agent is added to the polymer-enhanced foam during injection of the foam into the soil, thereby forming the foamed gel. Other embodiments of preparing the foamed gel also exist within the scope of the present invention, wherein the foamed gel is generated in situ simultaneous with placement of the foamed gel in the soil. In one such embodiment, the gelation solution and added gas are sequentially injected into the soil. The liquid gelation solution preferably precedes the gas, enabling the higher-mobility trailing gas slug to overtake and finger through the leading liquid slug as the injected fluids are displaced into the soil. The restricted flowpaths of the soil act as a natural foam generator. As the gelation solution and gas are passed through the pore throats of the soil, the foamed gel is generated. The volume of the liquid and gas slugs injected into the soil can be relatively small, but repetitive, to optimize utilization of the surfactant and formation of the foamed gel in situ. In another similar embodiment, the gelation solution and added gas are coinjected into the soil and the foamed gel is generated in situ as the gelation solution and gas pass through the pore throats of the soil.

Regardless of the particular embodiment by which the foamed gel is prepared, the volumetric gas content of the resulting foamed gel, termed foam quality, is expressed as the volume percent of gas in the foamed gel. When in the volume of soil to be treated, foamed gels having utility in the present process generally have a foam quality between about 20% and about 99%, preferably between about 50% and about 98%, and most preferably between about 60% and about 97%.

The physical properties of the foamed gel are a function of the specific foamed gel components and their relative proportions. Values of the above-recited variables are selected to create foamed gels across a wide range of structures, strengths, stabilities, and densities as desired. The character of the soil in which it is desired to place the foamed gel and the character of the migratory fluid flowing through the soil typically influence the selection of a specific foamed gel composition. In general, placement of a foamed gel in less permeable soils or soils having migratory liquids flowing therethrough exhibiting a relatively low natural drift pressure gradient for flow preferentially dictates selection of a foamed gel having relatively limited structure. In contrast foamed gels having a greater degree of structure are typically selected for placement in more permeable unconsolidated soils or soils having migratory liquids flowing therethrough exhibiting a relatively high natural drift pressure gradient for flow.

The degree of structure and the stability of the foamed gel formulated in the manner of the present invention is primarily a function of the character of the gel medium, and more specifically a function of the polymer and crosslinking agent properties and concentrations. Foamed gel strength is also an inverse function of foam quality. Thus, if a high strength foamed gel is desired, the foamed gel is often formulated with a relatively low foam quality. Conversely, if a lower strength, less costly, or lower density foamed gel is desired, the foamed gel is often formulated with a higher foam quality. Furthermore, the degree of structure and stability of a foamed gel containing an acrylamide polymer can be increased by increasing the polymer concentration of the liquid phase. However, an oftentimes more cost-effective and preferred means for achieving the same effect is to employ a higher molecular weight polymer or, alternatively, a polymer having a higher degree of hydrolysis at a relatively fixed polymer concentration. Conversely, a reduction in the degree of structure can be achieved by using a lower molecular weight polymer or, alternatively, one having a lower degree of hydrolysis. Consequently, the skilled practitioner can design the foamed gel in correspondence with the permeability of the soil being treated and the natural drift pressure of migratory liquids flowing therethrough, thereby ensuring the effective performance of the foamed gel as a soil sealant.

As is apparent from above, the requirements and performance of the foamed gel as a sealant are a function of its yield pressure. The "yield pressure", alternatively termed "critical pressure gradient for foam flow or rupture", is defined herein as the maximum pressure that can be applied to the foamed gel without foam flow or rupture of the foamed gel. When fluids migrate through the soil, the fluids exhibit a natural drift pressure gradient for fluid flow. It is necessary that the foamed gel occupying the fluid flowpaths, through which the fluid must pass to flow, exhibits a yield pressure higher than the natural drift pressure gradient for flow of the fluid. By satisfying this criteria, the migratory fluid is unable to mobilize or displace the foamed gel from the flowpaths. Thus, the foamed gel performs as an effective sealant in accordance with the present invention.

The present foamed gel is highly stable and resistant to flow. The foamed gel is stable for prolonged periods of time over a wide range of temperatures, pressures, water salinities, and water hardnesses. The foamed gel is also highly stable in the presence of many environmental contaminants, including liquid hydrocarbons, resisting collapse and fluid drainage in their presence. Thus, placement of the foamed gel in desired treatment regions of the soil provides long-term elimination of permeability to the natural drift of fluids, thereby substantially blocking the flow of migratory fluids through the treatment region when the foamed gel is fully in place. The process is particularly applicable to the blockage of undesirable migratory liquids, such as water or liquid hydrocarbons. Nevertheless, the soil can be restored to its original condition, if desired, by injection of a conventional gel breaker into the treatment region to degrade the foamed gel in situ.

It has further been found that foamed gels can be formed having soil sealing performance characteristics similar to those of conventional unfoamed gels despite the presence of gas in the foamed gels. Thus, it is apparent that the present foamed gels, like conventional unfoamed gels, can be tailored to meet the specific performance requirements of a treatment region, but at a substantially reduced chemical cost.

Placement of the foamed gel in a soil is preceded by injection of the foamed gel components into the soil in accordance with one of the above-described sequences via conventional injection means penetrating the soil. Exemplary injection means are open-ended tubing having the open end positionable within a treatment region of the soil or capped tubing having perforations or slots formed in the tubing that are positionable across the treatment region. When the foamed gel exits the injection means into the soil, placement is effectuated by displacing the foamed gel throughout the desired treatment region with materials injected behind it, typically water or an additional volume of the foamed gel.

If the foamed gel is immature, placement of the foamed gel is facilitated by the relatively high shear thinning properties thereof. Immature foamed gels exhibit relatively high effective viscosities when placed substantially beyond the injection point, but exhibit relatively low effective viscosities under the high flow rate, high pressure gradient for flow and high shear rate conditions encountered at or near the injection point during the injection step due to the ability of immature foamed gels to highly shear thin. Thus, the high shear thinning ability of immature foamed gels results in relatively good injectivity of such foamed gels into the soil with a minimum of injectivity reduction. Nevertheless, once an immature foamed gel is successfully placed in the soil, it beneficially shear thickens. Shear thickening along with gel maturation provides the foamed gel with sufficient structure and a sufficient yield pressure to render it an effective sealant.

In the practice of the present invention, the foamed gel may be placed in a selected treatment region of the soil as either a remedial treatment after undesirable fluids have entered the soil or as a preventative treatment before undesirable fluids enter the soil. In accordance with one embodiment, the treatment region in which the foamed gel is placed is a substantially vertical plane through the soil proximal to surface or subsurface leakage or spillage of toxic, hazardous or otherwise undesirable fluids. The foamed gel occupying the treatment region forms a barrier to lateral fluid flow past the treatment region, thereby mitigating the effect of the leak or spill in adjoining soil. Thus, the present embodiment can be employed to prevent the migration of the undesirable fluids into drinking water supplies or other water sources, such as reservoirs, wells, rivers, lakes and the like, by placing the foamed gel in a treatment region between the spill or leak site and the water source.

In a similar embodiment, the treatment region in which the foamed gel is placed is a substantially horizontal plane through the soil beneath surface or subsurface leakage or spillage of toxic, hazardous or otherwise desirable fluids. The foamed gel occupying the treatment region forms a barrier to downward fluid flow past the treatment region, thereby mitigating the effect of the leak or spill in underlying soil or strata. This embodiment can be employed to prevent the migration of the undesirable fluids into subterranean drinking water supplies or other water sources, such as aquifers, by placing the foamed gel in a treatment region between the spill or leak site and the water source.

In another embodiment, the treatment region is a circumferential or underlying volume of soil surrounding a subterranean building structure, such as a basement or foundation. Placement of the foamed gel in the treatment region forms a fluid impermeable barrier around the building structure preventing the invasion of rainwater or groundwater into the structure or the migration of the water into contact with the structure or adjacent water-sensitive soil, such as clay-containing soil.

In accordance with yet another embodiment, the treatment region is a circumferential or underlying volume of soil surrounding a surface or subsurface, open or enclosed, liquid containment, such as an open waste pit, an irrigation ditch or an enclosed underground storage tank. Placement of the foamed gel in the treatment region forms a fluid impermeable lining for the containment, preventing leakage of liquids from the containment into surrounding soil or underlying strata.

In another embodiment, the treatment region is a substantially horizontal plane residing between topsoil and an underlying subterranean strata. The foamed gel occupying the treatment region forms a barrier to either downward or upward fluid flow past the treatment region. The present embodiment can be employed to substantially prevent the downward percolation of contaminated surface water or leachate into the underlying strata. Alternatively, where the overlying topsoil is arable farmland, the present embodiment can be employed to substantially prevent the upward migration of underlying alkaline or highly saline aquifer water into the topsoil, or to prevent the downward migration of rainwater or irrigation water from the arable topsoil to underlying strata. It is apparent to the skilled artisan from the instant disclosure that there are numerous other related applications within the scope of the present invention.

The following examples demonstrate the practice and utility of the present invention, but are not to be construed as limiting the scope thereof.

EXAMPLE 1

A flooding experiment is performed at ambient temperature in a 122 cm long sandpack having a permeability of 130,000 md. The sandpack is at residual saturation with crude oil and a brine having significant hardness and sulfate concentrations. A gelation solution is prepared containing the above-described brine, 9,000 ppm PHPA, 170 ppm trivalent chromium ion complexed within a chromic acetate complex, and 3,000 ppm $C_{14-16}$ alpha olefin sulfonate surfactant. The PHPA is 2.1 mole % hydrolyzed and has a molecular weight of 11,000,000. The gelation solution is injected into the sandpack prior to any substantial gelation thereof and the apparent insitu viscosity of the gelation solution is measured as 240 cp. Thereafter, the substantially ungelled gelation solution and nitrogen gas are coinjected into the 130,000 md sandpack and the apparent insitu viscosity of the coinjected composition is measured as 220 cp. A fine-textured foam is produced from the sandpack having a foam quality of 88% at atmospheric pressure.

The injected composition is allowed to age to a mature crosslinked foamed gel in the sandpack. Thereafter, the sandpack is flooded with the brine for 120 hours while maintaining the differential pressure at 172 kPa. After 120 hours the permeability reduction ($k_f/k_i$) of the sandpack to the brine is measured to be $8 \times 10^{-7}$, wherein the final permeability, $k_f$, is 0.1 md. Upon completion of the brine flood, the sandpack is flooded with nitrogen gas by applying a 345 kPa differential pressure across the sandpack. No throughput of any fluids, including gas, is observed during this stage of gas flooding. The results of Example 1 show that the above-described foamed gel does not exhibit significant migration through the sandpack under a relatively high differential pressure as compared to natural fluid drift pressures. Likewise, the above-described foamed gel does not permit significant migration of other fluids through the sandpack under such conditions. In addition, the performance of the foamed gel is not diminished by the presence of a liquid hydrocarbon. Thus, it can be inferred that placement of the instant foamed gel in an unconsolidated near-surface soil would not permit the migration of liquid contaminants, including liquid hydrocarbons, therethrough, thereby showing the instant foamed gel to be an effective soil sealant.

EXAMPLE 2

A flooding experiment is performed at ambient temperature in a 30.5 cm long sandpack having a permeability of 126,000 md. The sandpack is at residual saturation with a crude oil and a brine having different compositions than those of Example 1. A gelation solution is prepared containing the brine, 7,000 ppm PHPA, 160 ppm trivalent chromium ion complexed within a chromic acetate complex, and 2,000 ppm $C_{14-16}$ alpha olefin sulfonate surfactant. The PHPA is 1.9 mole % hydrolyzed and has a molecular weight of 11,000,000. The gelation solution is injected into the sandpack prior to any substantial gelation thereof and the apparent insitu viscosity of the gelation solution is measured as 230 cp. Thereafter, the substantially ungelled gelation solution and nitrogen gas are coinjected into the 126,000 md sandpack and the apparent insitu viscosity of the coinjected composition is measured as 140 cp. A fine-textured foam is produced from the sandpack having a foam quality of 82% at atmospheric pressure.

The coinjected composition is allowed to age to a mature crosslinked foamed gel in the sandpack. Thereafter, the sandpack is flooded with the brine for 145 hours at a differential pressure of 345 kPa. After 145 hours, the permeability reduction ($k_f/k_i$) of the sandpack to the brine is measured to be $6 \times 10^{-7}$, wherein $k_f$ is 0.08 md. The results of Example 2 reaffirm that the above-described foamed gel can perform as an effective soil sealant, preventing fluid flow therethrough.

EXAMPLE 3

A residential home at the base of a hill has a concrete block basement positioned near underground springs that are activated during or immediately after heavy rains causing substantial water invasion through the surrounding loamy soil and concrete blocks into the basement. The soil around the home is treated in accordance with the present invention by preforming a foamed gel from a mixture of the following components: municipal drinking water, 8,000 ppm PHPA, 120 ppm trivalent chromium ion complexed within a chromic acetate complex, 3,000 ppm $C_{14-16}$ alpha olefin sulfonate surfactant, and $N_2$ gas. The PHPA is 30 mole % hydrolyzed and has a molecular weight of 7,000,000. The foamed gel has a foam quality of 90% at atmospheric pressure.

The foamed gel is injected into the loamy soil around the home at 1.5 foot intervals by means of a 1" ID spear tubing that is slowing forced down through the soil to a depth of 3 feet below the level of the basement floor. Particular attention is given to the soil around the uphill side of the home where more foamed gel is injected relative to the amount of foamed gel injected around the remaining sides of the home. One year after completion of the treatment no water invasion is detected into the basement despite the occurrence of substantial rainfall within that time period.

While the foregoing preferred embodiments of the invention have been described and shown, it is understood that alternatives and modifications, such as those suggested and others, may be made thereto and fall within the scope of the present invention.

I claim:

1. A process for blocking fluid flow in a soil comprising:
   placing a foamed gel in a treatment region of a soil, wherein said foamed gel comprises a polyacrylamide or a partially hydrolyzed polyacrylamide, a crosslinking agent containing a trivalent chromium cation complexed with at least one organic carboxylate anion, and said foamed gel further containing a surfactant, an aqueous solvent, and an added gas, and further wherein said foamed gel blocks flow of a migratory fluid in said soil.

2. The process of claim 1 for blocking fluid flow in a soil wherein said foamed gel has a yield pressure greater than the natural drift pressure gradient for flow exhibited by said migratory fluid.

3. The process of claim 1 for blocking fluid flow in a soil wherein said foamed gel is placed in said treatment region by displacing said foamed gel into said treatment region after preforming said foamed gel and injecting said foamed gel into said soil.

4. The process of claim 1 for blocking fluid flow in a soil wherein said foamed gel is placed in said treatment region by displacing said foamed gel into said treatment region after forming a gelation solution of said polymer, crosslinking agent, surfactant, and solvent, sequentially injecting said gas and said gelation solution into said soil, and mixing said gas and said gelation solution to form said foamed gel.

5. The process of claim 1 for blocking fluid flow in a soil wherein said foamed gel is placed in said treatment region by displacing said foamed gel into said treatment region after forming a gelation solution of said polymer, crosslinking agent, surfactant, and solvent, coinjecting said gas and said gelation solution into said soil, and mixing said gas and said gelation solution to form said foamed gel.

6. The process of claim 1 for blocking fluid flow in a soil wherein said foamed gel is placed in said treatment region by displacing said foamed gel into said treatment region after forming a foam of said polymer, surfactant, solvent and gas, and coinjecting said foam and said crosslinking agent into said soil, and mixing said foam and said crosslinking agent to form said foamed gel.

7. The process of claim 1 for blocking fluid flow in a soil further comprising:
   premixing said polymer, crosslinking agent, surfactant and solvent to form a gelation solution and combining said gelation solution with said gas at the surface to formulate said foamed gel; and
   injecting said foamed gel into said soil.

8. The process of claim 1 for blocking fluid flow in a soil further comprising:
   premixing said polymer, crosslinking agent, surfactant and solvent to form a gelation solution; and
   coinjecting said gelation solution and said gas into said soil.

9. The process of claim 1 for blocking fluid flow in a soil further comprising:

premixing said polymer, crosslinking agent, surfactant and solvent to form a gelation solution;

sequentially injecting said gelation solution and said gas into said formation; and combining said gelation solution and said gas in said soil to form said foamed gel.

10. The process of claim 1 for blocking fluid flow in a soil further comprising repeating the sequential injection of said gelation solution and said gas into said formation.

11. The process of claim 1 for blocking fluid flow in a soil further comprising:

premixing said polymer, surfactant, solvent and gas to form a foam; and coinjecting said foam and said crosslinking agent into said soil.

12. A process for blocking fluid flow in a soil comprising:

placing a foamed gel in a treatment region of a soil, wherein said foamed gel comprises a crosslinkable carboxylate-containing polymer, a crosslinking agent containing a reactive transition metal cation, a surfactant, an aqueous solvent, and an added gas, and further wherein said foamed gel blocks flow of a migratory fluid in said soil.

13. The process of claim 12 for blocking fluid flow in a soil wherein said carboxylate-containing polymer is an acrylamide polymer.

14. The process of claim 12 for blocking fluid flow in a soil wherein said reactive transition metal cation is chromium III.

15. The process of claim 12 for blocking fluid flow in a soil wherein said foamed gel has a yield pressure greater than the natural drift pressure gradient for flow exhibited by said migratory fluid in said soil.

16. A process for blocking fluid flow in a soil comprising:

placing a foamed gel in a treatment region of a soil, wherein said foamed gel comprises a polyacrylamide or a partially hydrolyzed polyacrylamide, a crosslinking agent, a surfactant, water, and a gas, and further wherein said foamed gel blocks flow of a migratory fluid in said soil.

17. The process of claim 16 for blocking fluid flow in a soil wherein said foamed gel has a yield pressure greater than the natural drift pressure gradient for flow exhibited by a said migratory fluid in said soil.

* * * * *